(12) United States Patent
Leister

(10) Patent No.: US 9,529,430 B2
(45) Date of Patent: Dec. 27, 2016

(54) DISPLAY WITH OBSERVER TRACKING

(71) Applicant: SEEREAL TECHNOLOGIES S.A., Munsbach (LU)

(72) Inventor: Norbert Leister, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 14/373,942

(22) PCT Filed: Jan. 25, 2013

(86) PCT No.: PCT/EP2013/051423
§ 371 (c)(1),
(2) Date: Jul. 23, 2014

(87) PCT Pub. No.: WO2013/110748
PCT Pub. Date: Aug. 1, 2013

(65) Prior Publication Data
US 2014/0361990 A1    Dec. 11, 2014

(30) Foreign Application Priority Data

Jan. 26, 2012 (DE) .................. 10 2012 201 166
Jun. 22, 2012 (DE) .................. 10 2012 105 479

(51) Int. Cl.
*G09G 5/00* (2006.01)
*G02F 1/13* (2006.01)
(Continued)

(52) U.S. Cl.
CPC .............. *G06F 3/013* (2013.01); *G02B 5/201* (2013.01); *G02B 5/32* (2013.01); *G02B 27/0093* (2013.01);
(Continued)

(58) Field of Classification Search
CPC ........................... G06F 3/013; G02B 27/0093
(Continued)

(56) References Cited

U.S. PATENT DOCUMENTS 6,188,462 B1 * 2/2001 Lavrentovich et al. ...... 349/201
7,450,188 B2 * 11/2008 Schwerdtner .................. 349/15
(Continued)

FOREIGN PATENT DOCUMENTS

CA    2 766 694 A1    12/2010
DE    103 39 076 A1    3/2005
(Continued)

OTHER PUBLICATIONS

McManamon et al, Proceedings of the IEEE, Bd. 97, No. 6, pp. 1078-1096 (2009) XP011257780.
(Continued)

*Primary Examiner* — Andrew Sasinowski
*Assistant Examiner* — Kuo Woo
(74) *Attorney, Agent, or Firm* — Saul Ewing LLP

(57) ABSTRACT

The invention relates to a display, in particular an autostereoscopic or holographic display, for representing preferably three-dimensional information, wherein the stereo views or the reconstructions of the holographically encoded objects can be tracked to the movements of the associated eyes of one or more observers in a finely stepped manner within a plurality of zones of the movement region. In this case, the zones are selected by the activation of switchable polarization gratings.

19 Claims, 14 Drawing Sheets

(51) Int. Cl.
  *G06F 3/01*    (2006.01)
  *G02F 1/1337*  (2006.01)
  *G02F 1/29*    (2006.01)
  *G02B 5/32*    (2006.01)
  *G03H 1/22*    (2006.01)
  *G02B 27/22*   (2006.01)
  *H04N 13/04*   (2006.01)
  *G02B 27/00*   (2006.01)
  *G02B 5/20*    (2006.01)
  *G02B 27/26*   (2006.01)
  *G02F 1/13363* (2006.01)
  *G03H 1/02*    (2006.01)

(52) U.S. Cl.
  CPC ............ *G02B 27/225* (2013.01); *G02B 27/26* (2013.01); *G02F 1/133753* (2013.01); *G02F 1/292* (2013.01); *G03H 1/2286* (2013.01); *G03H 1/2294* (2013.01); *H04N 13/0418* (2013.01); *H04N 13/0468* (2013.01); *G02F 1/1323* (2013.01); *G02F 2001/133631* (2013.01); *G02F 2001/133638* (2013.01); *G02F 2001/133757* (2013.01); *G02F 2001/291* (2013.01); *G02F 2201/305* (2013.01); *G02F 2203/07* (2013.01); *G02F 2203/24* (2013.01); *G03H 2001/0216* (2013.01); *G03H 2001/221* (2013.01); *G03H 2001/2236* (2013.01); *G03H 2001/2242* (2013.01); *G03H 2001/2292* (2013.01); *G03H 2222/34* (2013.01); *G03H 2222/36* (2013.01); *G03H 2223/19* (2013.01); *G03H 2223/20* (2013.01); *G03H 2223/22* (2013.01); *G03H 2223/23* (2013.01); *G03H 2226/05* (2013.01)

(58) Field of Classification Search
  USPC .................................. 345/156; 349/15, 201
  See application file for complete search history.

(56)             References Cited

U.S. PATENT DOCUMENTS

| | | |
|---|---|---|
| 2006/0279567 A1 | 12/2006 | Schwerdtner et al. |
| 2009/0073331 A1 | 3/2009 | Shi et al. |
| 2010/0157026 A1 | 6/2010 | Reichelt |
| 2010/0194854 A1 | 8/2010 | Kroll et al. |
| 2012/0206667 A1 | 8/2012 | Kroll et al. |
| 2013/0201416 A1* | 8/2013 | Kim et al. ............... 349/15 |
| 2015/0138455 A1* | 5/2015 | Liao .............. G02F 1/1323 349/15 |

FOREIGN PATENT DOCUMENTS

| | | |
|---|---|---|
| EP | 1 792 234 B1 | 7/2005 |
| EP | 2 160 658 B1 | 5/2008 |
| GB | 2 457 690 A | 8/2009 |
| WO | 2008/142156 A2 | 11/2008 |
| WO | 2010/149587 A2 | 12/2010 |
| WO | 2011/039286 A1 | 4/2011 |

OTHER PUBLICATIONS

Honma and Nose, Optics Express, vo. 20, No. 16, pp. 18449-18458 (2012).

International Search Report, dated Jun. 10, 2013, and Written Opinion issued in International Application No. PCT/EP2013/051423.

\* cited by examiner

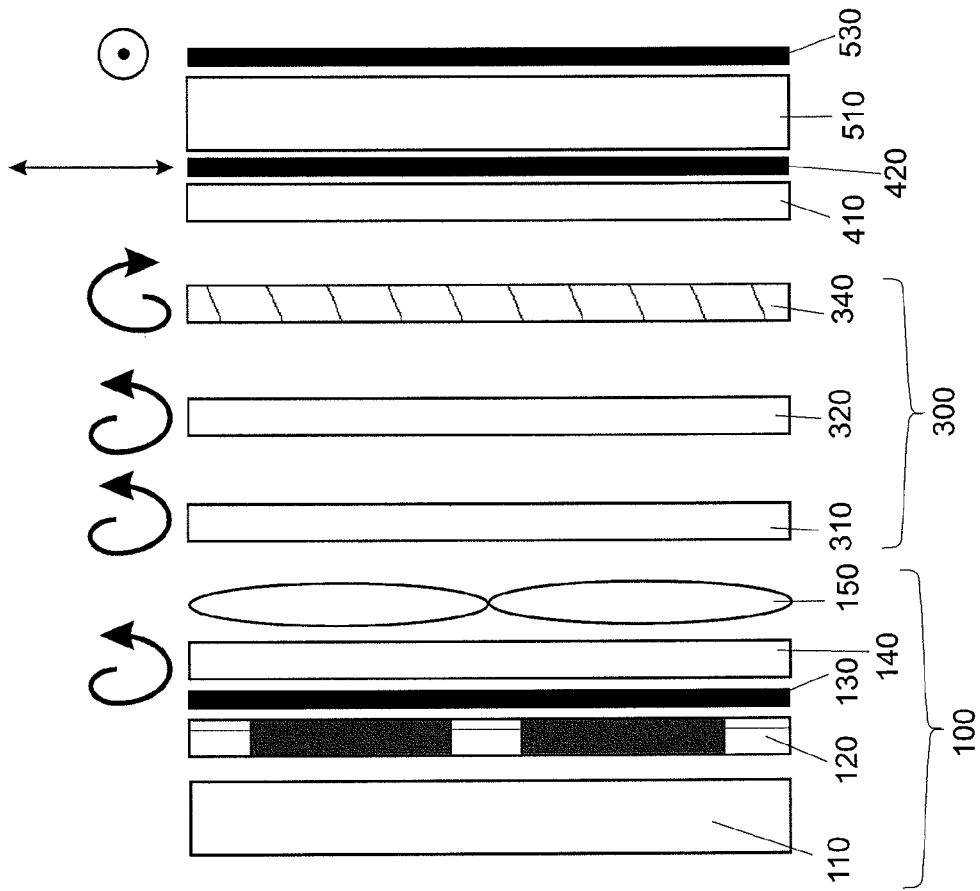
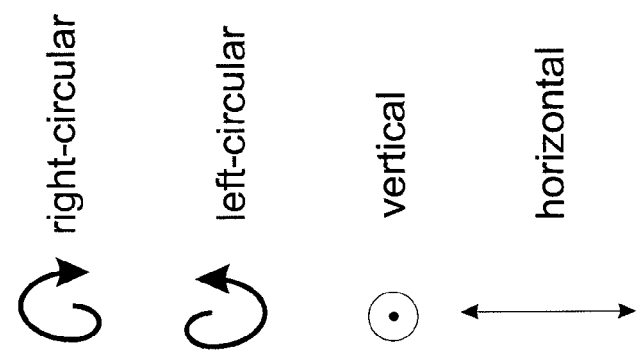

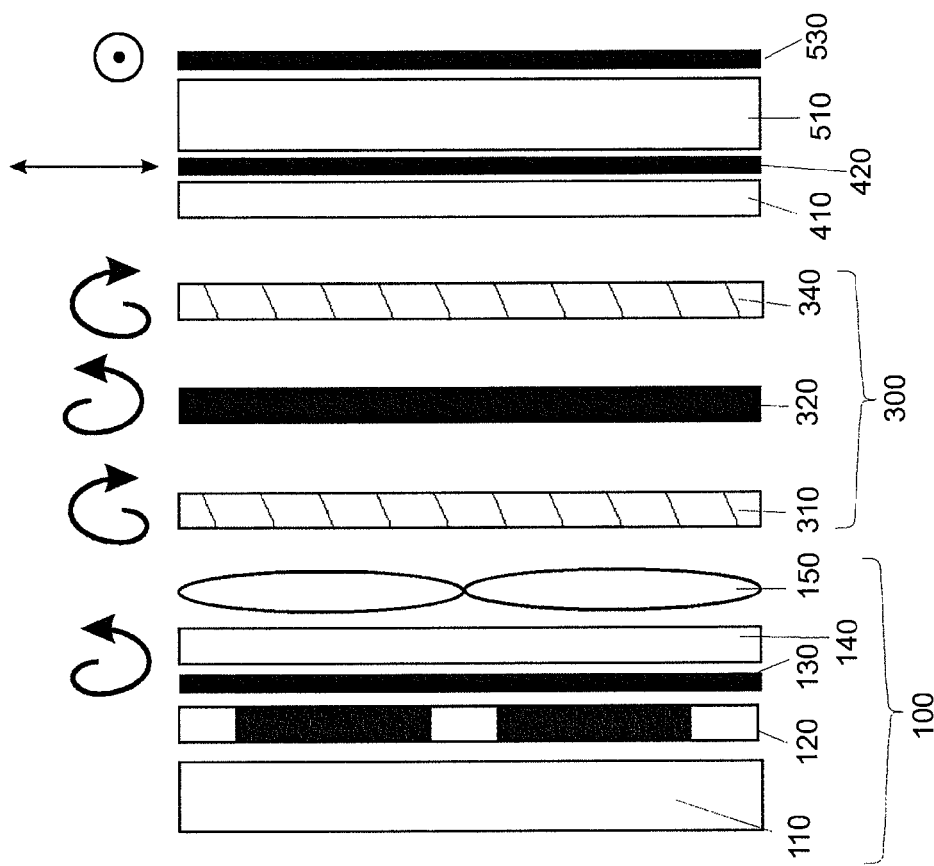

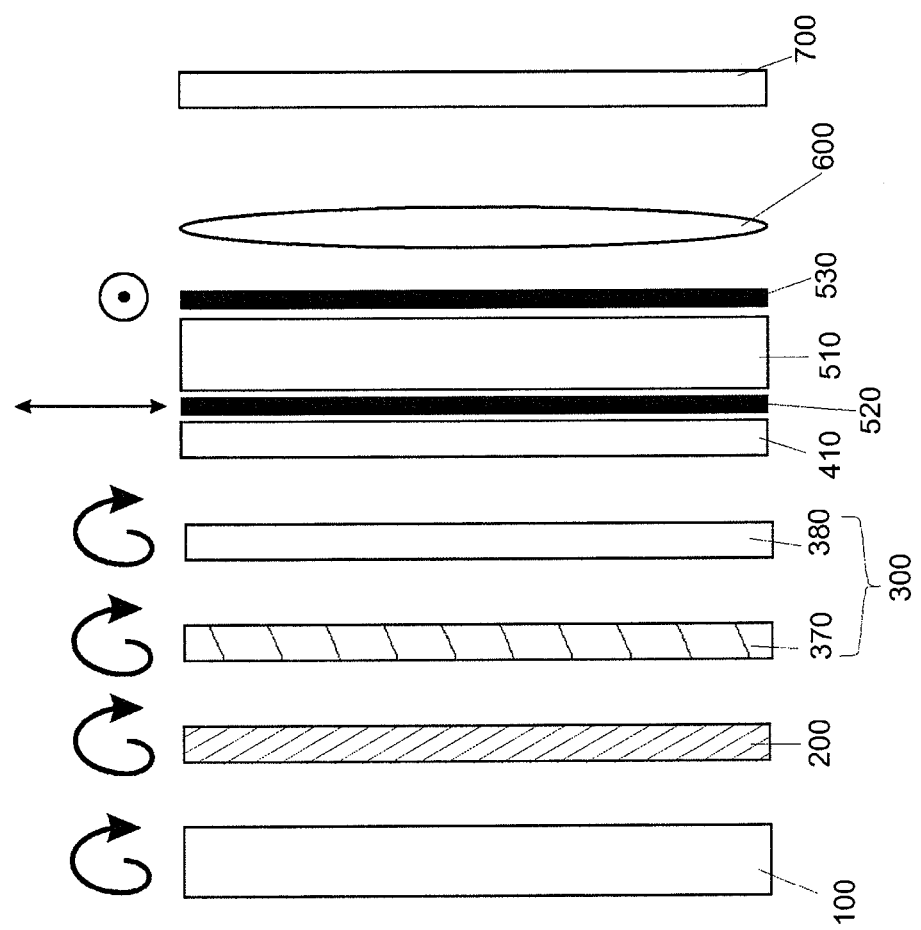

DISPLAY WITH OBSERVER TRACKING

CROSS REFERENCE TO RELATED APPLICATIONS

This application claims the priority of PCT/EP2013/051423, filed on Jan. 25, 2013, which claims priority to German Application No. 10 2012 201166.8, filed Jan. 26, 2012, and German Application No. 10 2012 05479.7, filed Jun. 22, 2012, the entire contents of each of which are incorporated fully herein by reference.

BACKGROUND OF THE INVENTION

The invention relates to a display, in particular an autostereoscopic or holographic display, for representing preferably three-dimensional information, wherein the stereo views or the reconstructions of the holographically encoded objects can be tracked to the movements of the associated eyes of one or more observers.

Displays for displaying three-dimensional information are known in a multiplicity of embodiments. Besides embodiments which require additional aids such as shutter or polarization spectacles for viewing the spatial scene, autostereoscopic displays do not require such aids. Without additional measures, however, in the latter displays the 3-D scene can be viewed only in a narrow spatial region, the so-called observer region. In order that the 3-D scene can also be seen conveniently in a large horizontal angular range, devices have been developed which allow said observer region to be tracked to the eyes of the observer. Such a system has been described e.g. by the applicant in the patent specification DE 103 39 076 B4. The applicant has likewise described a series of holographic display devices, e.g. in EP 1 563 346 B1 or EP 1 792 234 B1, wherein a 3-D scene can be perceived in a narrowly delimited observer region as a spatial reconstruction of the intensity distribution by means of holographic diffraction patterns being encoded in a spatial light modulator. Here as well it is expedient for the observer region to be tracked to the eye movements of one or more observers. For this purpose, such devices have a recognition system that determines the positions of the eyes of the observers and forwards the data to a system controller. The recognition systems often operate in a camera-based manner, wherein the eye positions are determined by means of image processing algorithms. In accordance with the respective eye positions, the system controller controls mechanical or electronic light deflection means such that the center of the observer region assigned to the respective eye position as far as possible corresponds to the respective eye position to the greatest possible extent. If desired or necessary, at the same time the image content or the reconstruction of the 3-D scene can be adapted to the new eye position.

In such a display, an illumination unit generates light that is collimated to the greatest possible extent with the required wavelength spectrum with which the spatial light modulator into which the stereoscopic views are written or the holographic information is encoded is illuminated. In the case of holographic displays, the light must additionally be capable of interference at least in a region required for encoding a pixel of the 3-D scene, i.e. said light must be sufficiently coherent. The light deflection means can be situated upstream and/or downstream of the spatial light modulator.

The illumination unit can also be configured in a controllable manner such that it can direct light in predefinable spatial directions. For this purpose, for example, displaceable illumination columns can be situated in direct proximity to the focal plane upstream of a cylindrical lens array. The illumination columns can be controllably selected for example from an active light source matrix, which can be embodied e.g. as an OLED matrix. It is also possible to use a planar light source, in front of which is arranged an array of slit diaphragms that are variable in drivable manner in terms of their horizontal position. Such a diaphragm array can be configured as an LCD matrix, for example. In this case, each column forms a secondary light source which illuminates that cylindrical lens of the cylindrical lens array which is assigned to it. The horizontal position of the illumination columns with respect to the center line of the assigned cylindrical lens determines the horizontal angle—emitted by the respective cylindrical lens—of the partial beam that is collimated to the greatest possible extent. In this case, a plurality of illumination columns can also be activated simultaneously in order to increase the emitted angular range and thus the size of the assigned observer region. Furthermore, the horizontal deviation of the position of the illumination columns with respect to the center line of the assigned cylindrical lens can vary over the area of the cylindrical lens array in order e.g. to realize an additional field lens function and thus to adapt the horizontal diameter of the assigned observer region to the observer distance. The cylindrical lens array can have a diaphragm array that avoids crosstalk between the illumination columns assigned to a cylindrical lens and neighboring cylindrical lenses. Undesired secondary observer regions can thus be avoided.

The number of illumination columns assigned to a cylindrical lens determines the number of possible horizontal deflection angles. This number cannot be increased arbitrarily, since the primary and/or secondary light sources have technically dictated minimum dimensions. Moreover, the required luminance increases, the smaller the dimensions become. For a large horizontal movement region in which a plurality of observers can also be situated, however, a large number of finely gradated light deflection angles are required for observer tracking. Therefore, a series of additional measures have already been proposed for increasing said movement region and thus the number of possible deflection angles. By way of example, in the U.S. Pat. No. 7,791,813 B2, arrays of electrically controllable electrowetting cells were to be used for beam deflection. However, such arrays are complicated to produce and have a restricted aperture on account of the cell height. Mechanical deflection means such as deflection mirrors or rotatable prisms, which were likewise proposed, are sluggish and require a large structural volume.

Therefore, the present invention is based on the object of specifying and developing a display of the type mentioned in the introduction which overcomes the problems mentioned above. In particular, the intention is to enable the observer tracking for one or more observers in a finely stepped manner in a plurality of movement zones, which preferably overlap, without mechanical light deflection means.

SUMMARY OF THE INVENTION

The object is achieved according to the invention by means of the teaching of patent claim 1. Further advantageous configurations and developments of the invention are evident from the dependent claims.

According to the invention, a display, in particular an autostereoscopic or holographic display, wherein image views or reconstructions of holographically encoded objects can be tracked to the movements of associated eyes of at least one observer, has an illumination unit comprising light sources for generating light that is collimated to the greatest possible extent with a predefinable emission characteristic, at least one polarization grating stack having a stack of optical components comprising at least two switchable or controllable polarization gratings each comprising a grating structure that can be switched on for light deflection, a spatial light modulator for modulating the light of the illumination unit for displaying image information or for reconstructing encoded hologram information, a recognition system for determining positions of the associated eyes of the at least one observer, and a system controller for driving and synchronizing the switchable and controllable elements, wherein, depending on the current position of the eyes of a observer, the illumination unit and the polarization grating stack are drivable by the system controller in such a way that the light of the illumination unit is deflectable in the direction of the eyes of the observer.

In this case, the emission characteristic of the illumination unit is determined by the type of display. For holographic displays, use is preferably made of narrowband light sources having good coherence properties, such as are constituted by laser light sources, for example. For autostereoscopic displays, it is possible to use inorganic or organic luminescence diodes, for example, which have a wider wavelength spectrum.

The polarization gratings of the polarization grating stack are driven by the system controller such that a respective grating is active and directs the light in the predefined direction in order thus to generate a zone of the movement region. The switchable polarization gratings can be configured as switchable liquid crystal polarization gratings, for example. For this purpose, the liquid crystal alignment layer has a periodically recurring structure for locally changing the liquid crystal orientation that determines the polarization of the light passing through. The shorter this period, the greater the diffraction angle and thus the light deflection angle for the predefined wavelength of the light. By applying a voltage to electrodes which are assigned to the liquid crystal layer, it is possible for the alignment of the liquid crystal molecules that is brought about by the liquid crystal alignment layer to be canceled and thus for the polarization grating to be switched off. The light then passes through this grating without being deflected.

The grating period can be varied locally in order, for example, additionally to enable a field lens function.

The light sources of the illumination unit can be arranged in an array of primary light sources as a light source matrix, which are switchable or controllable individually or in columns. Said light sources can be LEDs, OLEDs or laser diodes, for example.

The light sources can be controlled separately in terms of their brightness by the system controller, in order e.g. to compensate for locally different transparencies in the beam path or to improve the contrast when displaying the image information.

In order to form a color display, different light sources are preferably used, which differ in terms of their emitted wavelength spectrum, in particular the focus wavelength, and which are separately operable. The individual colors can thus be generated in time division multiplex, i.e. in temporal succession. For this purpose, the system controller synchronizes the driving of the respective color with the writing of the associated color information into the spatial light modulator.

The different image contents or encoding information for the right and left eyes can likewise be written time-sequentially in a synchronized manner by the system controller. In this case, the required deflection directions for generating the associated observer region are respectively set for each eye. It is also possible, in the case of a plurality of observers, to write a dedicated view or encoding information item for each observer eye. Color and view changes can be suitably combined, such that as far as possible no disturbances, in particular disturbing flickering, become visible to the observers.

A controllable diaphragm array, which can be configured for example as an array of controllable slit diaphragms, can be arranged upstream of the polarization grating stack. This array can be integrated in the illumination unit.

The diaphragm array is preferably illuminated by a planar light source.

Such a diaphragm array can consist of a matrix of individually drivable liquid crystal cells, for example. Said cells can be arranged in columns. However, a two-dimensional matrix arrangement of controllable cells can also be used, wherein the correct columns are selected by the driving of the associated cells by the system controller and thus form secondary columnar light sources.

With the use of a light source matrix or an array of slit diaphragms, the control of the light sources or the position of the slit diaphragms can be set such that this compensates for the wavelength dependence of the deflection angles of the switchable polarization gratings of the polarization grating stack. In the case of time-sequential illumination with red, green and blue light, for example, the position of the slit diaphragms is set for each color in such a way that for all colors light is directed to the same detected observer position.

The illumination unit can contain a cylindrical lens array for the purpose of collimation. In this case, the cylindrical lenses are aligned along the illumination columns. Preferably, the illumination columns, which are correspondingly embodied as primary or secondary light sources, are situated to the greatest possible extent in the focal plane of the cylindrical lenses. The cylindrical lenses can also be embodied as gradient-index lenses. A multi-stage construction with a plurality of imaging surfaces arranged one behind another can also be employed, wherein at least one intermediate imaging can also be effected. As a result of the displacement of the illumination columns by the system controller transversely with respect to the cylindrical lenses, finely gradated tracking of the light of the illumination unit in the direction of the eyes of the observer can be effected.

In this case, the columns can be driven such that the tracking angle varies over the area of the cylindrical lens array, in order to obtain a field lens function and/or to achieve an adaptation of the width of the observer region assigned to the respective eye to the observer distance, in order that from all positions of the movement region a 3-D view can be perceived as far as possible without any disturbances.

The cylindrical lens array can itself already contain a field lens function, which for example forms a observer region at the preferred observer position. Such a preferred observer position is situated e.g. in the center of the horizontal movement region at the average movement distance.

The illumination unit can set the circular polarization direction of the light that is required for the downstream polarization grating stack.

It is also possible to arrange for that purpose a separate means that influences the polarization of the light upstream of the polarization grating stack. Such a means can contain a birefringent retardation layer, for example, which is configured as a quarter-wave plate and converts linear light, emitted purely by way of example by the illumination unit, into circularly polarized light.

An additionally fixed or variable field lens can be contained in the beam path between the illumination unit and the observer in order to predefine the width of the observer region assigned to the respective eye at the predefined location of the respective observer eye or to set it depending on said location. The field lens can also be part of the illumination unit, situated between the latter and the polarization grating stack, arranged downstream of the polarization grating stack or situated between spatial light modulator and observer.

The polarization grating stack is preferably arranged in the light path between the illumination unit and the spatial light modulator. However, it is also possible to arrange the polarization grating stack in the light path downstream of the spatial light modulator.

The polarization grating stack can preferably contain as optical component at least one additional switchable Or controllable birefringent retardation layer, preferably configured as a switchable or controllable half-wave plate. In the switched-off state the circularly polarized light that radiates through said layer maintains its direction of rotation. In the switched-on state, the direction of rotation of the circularly polarized light is changed and thus corresponds to the direction of rotation of a switched-on polarization grating of the polarization grating stack for the same direction of rotation of the input polarization. What can be achieved with this birefringent retardation layer is that at the output of the polarization grating stack, for the same input direction of rotation, the same output direction of rotation is always achieved, irrespective of whether or not a grating is switched on, since, with a polarization grating switched off, the light is transmitted without being deflected and without a change in the direction of rotation of the circular polarization. If the birefringent retardation layer is configured in a controllable fashion, for example as a controllable liquid crystal layer, it is possible to compensate for dispersion effects or changes in the effective optical path length in the case of oblique beam passage. For this purpose, the retardation layer is to be synchronized with the other active components by means of the system controller.

An additional retardation layer can be situated downstream of the polarization grating stack in order to convert circularly polarized light into linearly polarized light. That is advantageous for example if the downstream assembly, for example the spatial light modulator, requires linearly polarized light for its operation. Such a retardation layer can be configured as a quarter-wave plate, for example. For color displays, said retardation layer can advantageously be configured in an achromatic or apochromatic fashion. It is also possible for said birefringent retardation layer to be configured in a controllable fashion, for example as a controllable liquid crystal layer, in order to compensate for dispersion effects or changes in the effective optical path length in the case of oblique beam passage. For this purpose, the retardation layer is to be synchronized with the other active components by means of the system controller.

A polarization filter can advantageously be arranged in the light path downstream of said retardation layer, said polarization filter suppressing linearly polarized light of the zeroth order of diffraction of a switched-on polarization grating of the polarization grating stack, that is to say light which passes through the polarization grating without diffraction. This light is linearly polarized and is perpendicular to the light which leaves the retardation layer after deflection by a switched-on polarization grating of the polarization grating stack. Said polarization filter can also be part of a downstream spatial light modulator, for example if the latter requires linearly polarized light for its manner of operation.

Light sources that are controllable in terms of their direction have a high power demand, particularly if they operate with controllable slit diaphragms. It is therefore particularly advantageous, instead of light sources that are controllable in terms of their direction or in order to support said light sources, to arrange a controllable deflection grating having a variable grating period upstream of, downstream of or in the polarization grating stack, with which grating period a finely stepped additional light deflection can be carried out. Such gratings are advantageously embodied as polarization gratings having a variable grating period. Such controllable polarization gratings can be configured for example as electrically controllable liquid crystal cells. In this case, the polarization of the light passing through is influenced locally by a voltage pattern being applied to a finely dimensioned electrode structure, wherein the magnitude of the applied voltage determines the alignment state of the liquid crystal molecules. Like the switchable polarization gratings of the polarization grating stack, these gratings diffract circularly polarized light only in one order of diffraction. The diffraction angle can be set by means of the period of the voltage profile. The diffraction direction is determined by the local voltage profile within a period. Preferably, the voltage profile is saw tooth-shaped, wherein the direction of the pulse ramp determines the deflection direction. Since the variable polarization grating need have only a small deflection angle range, a large angle range is achieved by the zone division with the switchable polarization gratings, and the requirements made of the fineness of the electrode structure can be kept in a realizable range.

The period of the voltage profile to be applied to the electrode structure can be varied over the area of the grating in order to additionally obtain or support a field lens function. It is particularly advantageous that the focus of said field lens can be changed solely by the electronic driving by means of the system controller.

Such a controllable variable grating can also advantageously be used to compensate for the wavelength dependence of the deflection angles of the switchable polarization gratings of the polarization grating stack.

The illumination unit can advantageously also be configured such that it has controllably different light emergence angles. This can be, for example, an array of directional light sources which have different emission directions either in a spatially alternating manner or in a temporally switchable manner.

At least one optical component in a polarization grating stack used can be embodied as segmented in one or two directions, wherein the individual segments can be separately switched or controlled. Thus, different deflection angles can be realized in a manner dependent on the passage location of the light through the polarization grating stack, in order for example to form or support an additional field lens function in order to better track light to a observer for example in the case of an extensive display.

The segmentation can for example also be effected in the form of concentric circular or elliptic rings.

The grating structure of at least one polarization grating in the polarization grating stack can also be arranged in a manner rotated with respect to other polarization gratings in order to enable a two-dimensional deflection. In this case, the individual polarization gratings can differ in terms of their grating constant in order to enable different deflection angles in the directions rotated with respect to one another. It is particularly advantageous in this case if the grating structures of the polarization gratings are aligned perpendicularly to one another.

Polarization gratings rotated with respect to one other in terms of their grating structure can also be arranged in separate polarization grating stacks in order for example to arrange further components such as controllable deflection gratings having a variable grating period and/or light modulators and/or field lenses between them. In this regard, in each case a separate controllable deflection grating having a variable grating period for a finely stepped deflection of the respective deflection direction can be arranged downstream of the associated polarization grating stack.

By changing the voltage at a controllable polarization grating, it is possible to influence the deflection effectiveness and thus that proportion of the light which is deflected in the $+1^{st}$ or $-1^{st}$ order of diffraction depending on the circular polarization direction. Besides control of the intensity of the light sources and/or the modulation intensity of the light modulator, it is thus possible to reduce intensity fluctuations, for example, such as can occur for example as a result of different diffraction effectivenesses for individual polarization gratings of the polarization grating stack or for different spectral distributions of the light sources of the illumination device or further angle-dependent optical losses of the optical system.

Conventional polarization gratings have the property that they alter the polarization direction of the light passing through. By way of example, if left circularly polarized light is incident on such a polarization grating, then the light deflected by said grating emerges again in right circularly polarized fashion. Right circularly polarized light deflected by such a grating correspondingly emerges in left circularly polarized fashion, wherein the signs of the associated first order of diffraction differ. Since the deflection direction, i.e. the sign of the associated first order of diffraction for downstream polarization gratings in a stack of polarization gratings is also influenced by the circular polarization direction incident on said polarization gratings, it is necessary to take account of or set the possible polarization changes in the arrangement of the polarization gratings in the stack, as already described. This is advantageously done by means of switchable or controllable retardation layers between the polarization gratings in order to adapt the direction of rotation of the circularly polarized light to the desired deflection direction, that is to say to the $+1^{st}$ or $-1^{st}$ order of diffraction.

A publication "Twisted nematic liquid crystal polarization grating with the handedness conservation of a circularly polarized state" by Honma and Nose, Optics Express Vol. 20, pages 18449-18458, 2012, describes a specific type of polarization grating in which the deflected light emerging from the polarization grating has the same circular polarization state as the incident light. This type of polarization grating is based on a liquid crystal structure having a periodic twist. The setting of such a twist is achieved by means of a periodic surface orientation of the liquid crystal molecules in the liquid crystal layer which has an opposite direction of rotation on both substrates. What is disadvantageous about this type of polarization grating is that relatively thick liquid crystal layers are required, such that small grating periods and short switching times can be realized only with difficulty. Therefore, the majority of the exemplary embodiments mentioned below relate to conventional polarization gratings. Generally, the invention is also applicable to the type of grating described in the publication by Honma and Nose. A polarization grating stack can also contain gratings of both types in mixed form. In these gratings, too, the desired deflection direction can be selected by means of the direction of rotation of the circularly polarized light entering the respective polarization grating.

There are, then, various possibilities of advantageously configuring and developing the teaching of the present invention and/or of combining the above-described embodiments—insofar as possible—with one another. In this respect, reference should be made firstly to the patent claims subordinate to patent claim 1 and secondly to the following explanation of the preferred exemplary embodiments of the invention with reference to the drawings. Generally preferred configurations and developments of the teaching are also explained in conjunction with the explanation of the preferred exemplary embodiments of the invention with reference to the drawing. In the drawing, in each case in a schematic illustration:

BRIEF DESCRIPTION OF THE DRAWINGS

FIG. 10 shows a tenth configuration variant similar to claim 6, in which the polarization grating stack 300 has polarization gratings 380, 390 which are based on a twisted structure and which do not change the polarization direction in the case of a light deflection.

DETAILED DESCRIPTION OF THE INVENTION

Figure 1C:
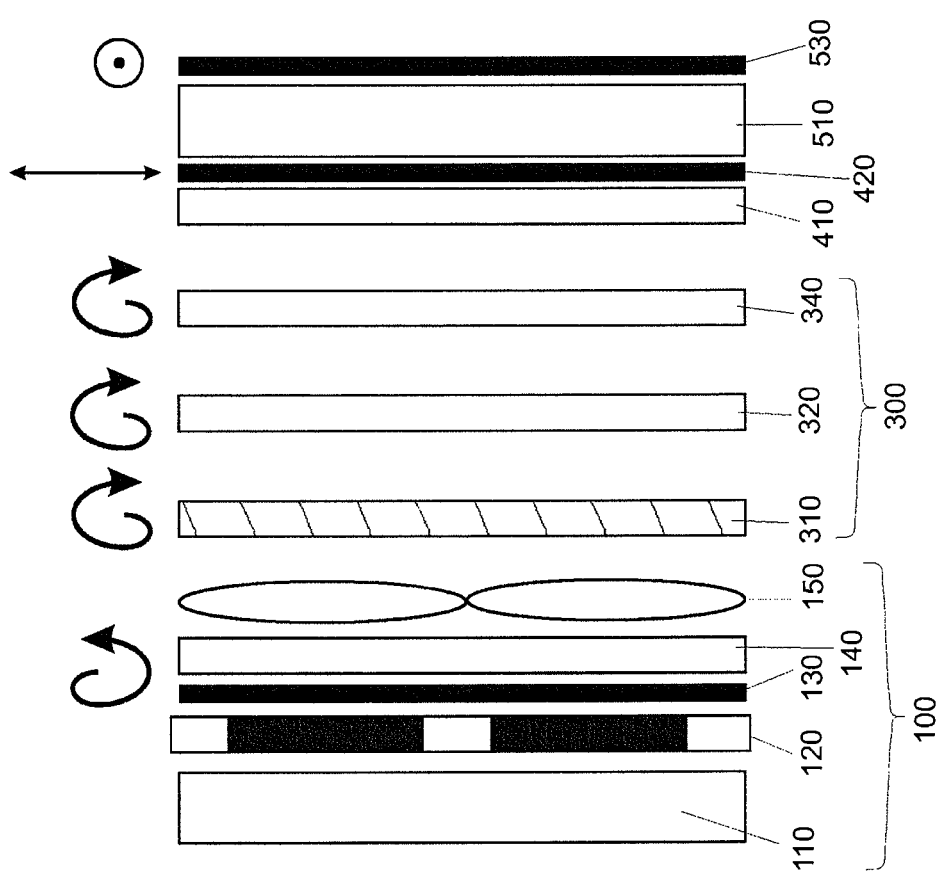
FIG. 1a shows an explanation of the symbols used in the drawings for the polarization directions.
FIG. 1b shows a first configuration variant with displaceable light source columns in a controllable slit diaphragm array 120 in which a second polarization grating 340 of a polarization grating stack 300 is switched on, FIG. 1c shows a first configuration variant with displaceable light source columns in a controllable slit diaphragm array 120 in which a first polarization grating 310 of a polarization grating stack 300 is switched on, FIG. 1d shows a first configuration variant with displaceable light source columns in a controllable slit diaphragm array 120 in which a switchable half-wave plate 320 of a polarization grating stack 300 is switched on, FIG. 1e shows a first configuration variant with displaceable light source columns in a controllable slit diaphragm array 120 in which two polarization gratings 310, 340 and a switchable half-wave plate 320 of a polarization grating stack 300 are switched on, FIG. 2 shows a second configuration variant with a controllable variable polarization grating 200 and a field lens 600 in which a second polarization grating 340 of a polarization grating stack 300 is witched on, FIGS. 3a and 3b show a third configuration variant, wherein the illumination unit 100 additionally has controllably different light emergence angles.

FIG. 1a shows the symbols—used in FIGS. 1 to 6—of the polarization direction leaving the respective illustrated optical element for the light passing through. The symbols are situated above the relevant optical elements in the drawings. Right and left circular polarization and vertical and horizontal linear polarization are illustrated.

A first configuration variant of the invention is illustrated purely schematically in FIGS. 1b to 1e. An illumination unit 100 that is collimated to the greatest possible extent and is controllable in the emission direction contains a light source matrix 110, a controllable slit diaphragm array 120, which can be embodied as a controllable liquid crystal matrix, a linear polarization filter 130, which can advantageously be configured as an output polarizer of the liquid crystal matrix, a birefringent retardation layer 140, for generating the required circular polarization from the linear polarization, which can advantageously be configured as a quarter-wave plate, and a cylindrical lens array 150 for collimating the light stripes emerging from the slit diaphragms. The birefringent retardation layer 140 or the birefringent retardation layer 140 and the linear polarization filter 130 can also be situated in the light path downstream of the cylindrical lens array 150. Purely by way of example, left circularly polarized collimated light leaves the cylindrical lens array 150 and impinges on the polarization grating stack 300, which contains here purely by way of example a first switchable polarization grating 310, a switchable birefringent retardation layer 320, which can advantageously be configured as a switchable half-wave plate, and a second switchable polarization grating 340. The polarization grating stack 300 is followed here by a birefringent retardation layer 410, which can advantageously be configured as a quarter-wave plate, for generating linearly polarized light from the right circularly polarized light leaving the polarization grating stack. In a downstream linear polarization filter 420, this light is converted into horizontally polarized light. At the same time, vertically polarized light that arises in the zeroth order of diffraction of a switched-on polarization grating is blocked. The polarizer 420 is followed by a spatial light modulator 510, which is followed here purely by way of example by a polarization filter 530 serving as an analyzer. The polarizer 420, as illustrated in FIG. 2, can also serve as an analyzer for the spatial light modulator.

In FIG. 1b, the second polarization grating 340 is switched on, i.e. this diffraction grating is active and directs the light into its zone (not illustrated here) of the movement region of the observers. At this grating, no voltage that destroys the grating-shaped alignment of the liquid crystal molecules is present at the electrodes. Accordingly, right circularly polarized light leaves the second switchable polarization grating 340. The first switchable polarization grating 310 and the switchable half-wave plate 320 do not influence the polarization state.

Figure 2:
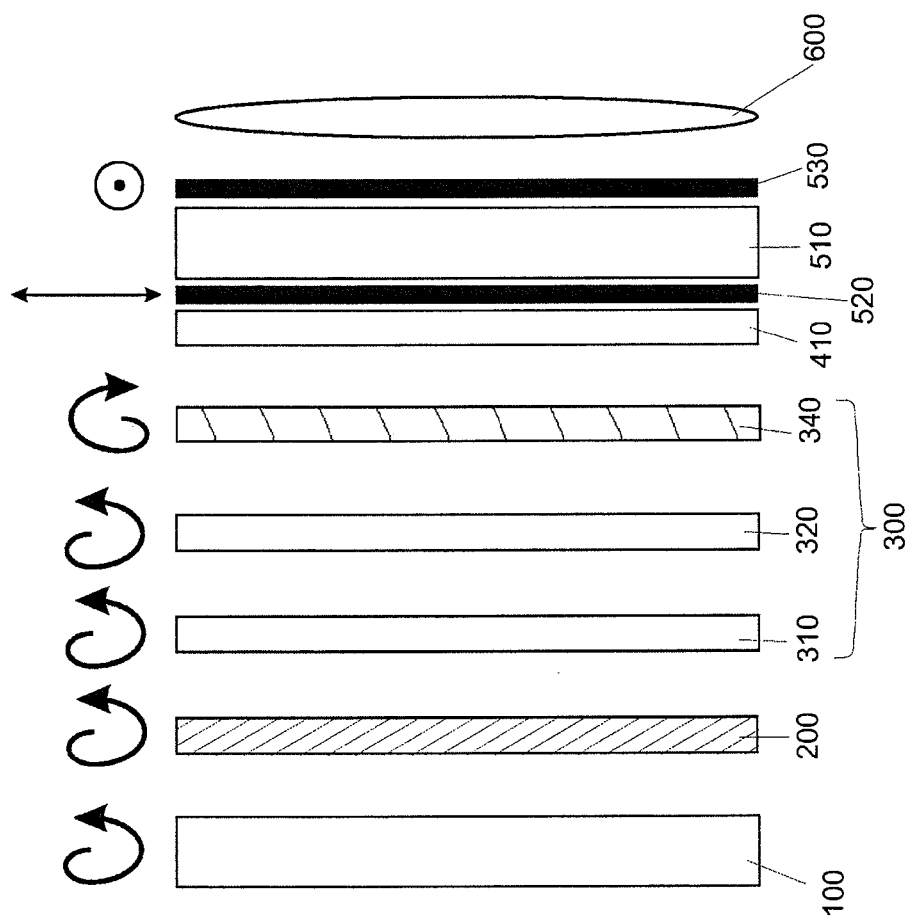

In FIG. 1c, the first switchable polarization grating 310 is activated and generates that zone of the movement region of the observers which is assigned to it. Here right circular light leaves this polarization grating 310 and its polarization direction is not altered in the downstream non-activated switchable birefringent retardation layer 320 and the second non-activated switchable polarization grating 340.

Figure 1D:
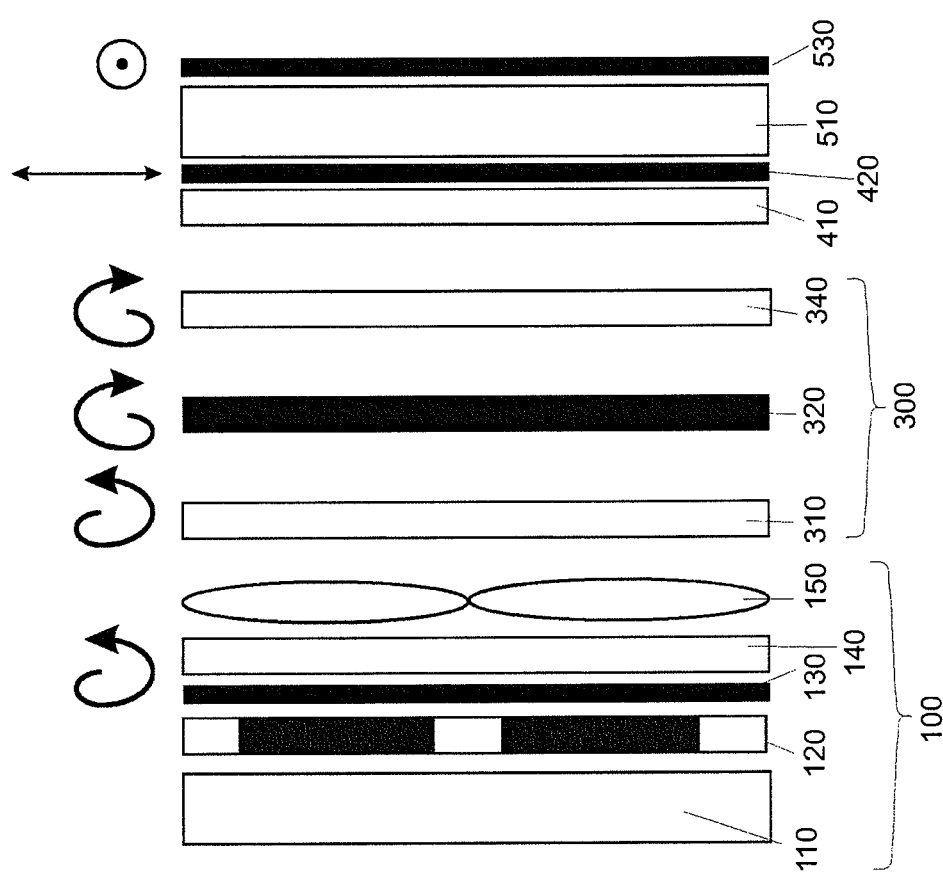

In FIG. 1d, neither of the two switchable polarization gratings 310 and 340 is activated. The light passes through the polarization grating stack 300 without being deflected and forms a third zone of the movement region for the observers. The activated birefringent retardation layer 320 here provides for the necessary rotation of the direction of rotation of the polarization from left circular to right circular, in order that the correct linear polarization direction arrives at the polarization filter 420.

In FIG. 1e, both polarization gratings 310 and 340 are activated. A combination of the light deflection of both polarization gratings 310 and 340 can thus be used for observer tracking. In this case, too, the activated birefringent retardation layer 320 provides for the rotation of the direction of rotation of the polarization, in order that the correct linear polarization direction arrives at the polarization filter 420.

The controllable birefringent retardation layer 320 is activated whenever an even number of polarization gratings is activated. The controllable birefringent retardation layer 320 is not activated when an odd number of polarization gratings is activated. As a result, an identical direction of rotation of the circular polarization downstream of the polarization grating stack 300 is always obtained.

FIG. 2 shows a second exemplary embodiment. Here, an illumination unit 100 generates purely by way of example collimated left circularly polarized light. The latter illuminates a downstream controllable polarization grating 200, the grating period of which is used to set the beam direction in the activated zone of the downstream polarization grating stack 300, which here likewise purely by way of example contains a first switchable polarization grating 310, a switchable birefringent retardation layer 320 and a second switchable polarization grating 340. The polarization filter 520 downstream of the birefringent retardation layer 410 is assigned here to the spatial light modulator 510, which likewise has a polarization filter 530 as an analyzer. Downstream in the beam path, a field lens 600 is provided here purely by way of example, said field lens advantageously being configured as a flat Fresnel lens.

Figure 3A:
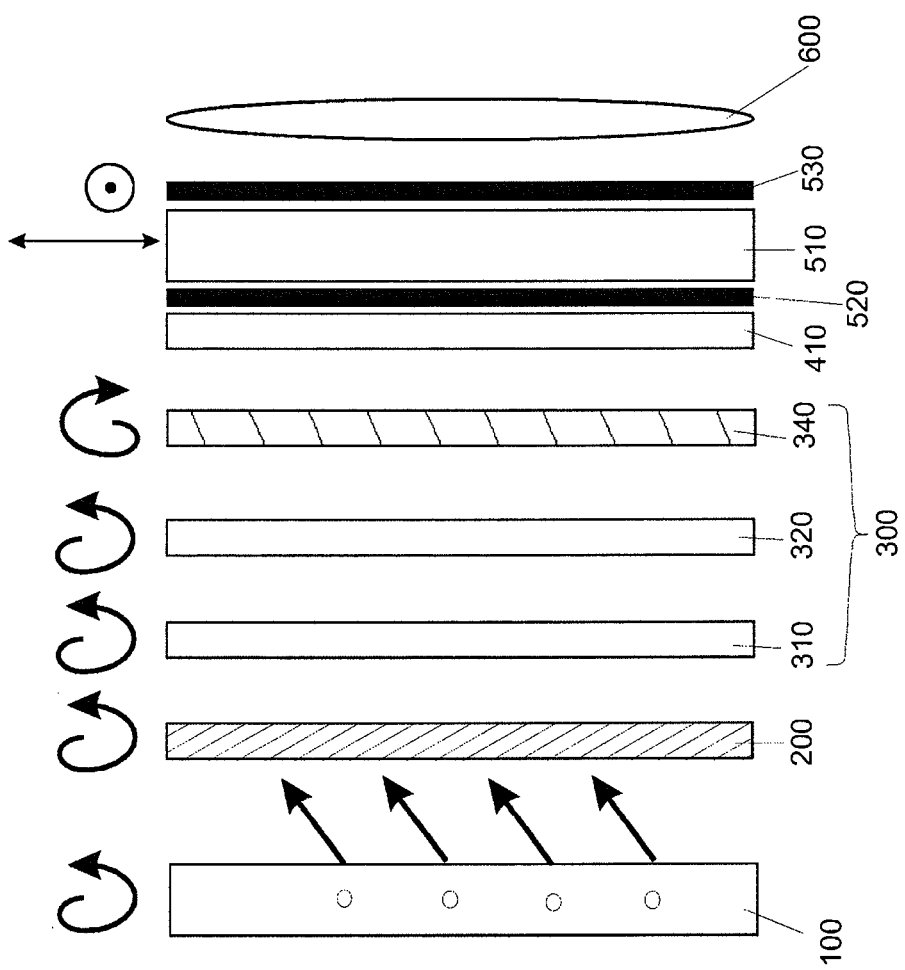
Figure 3B:
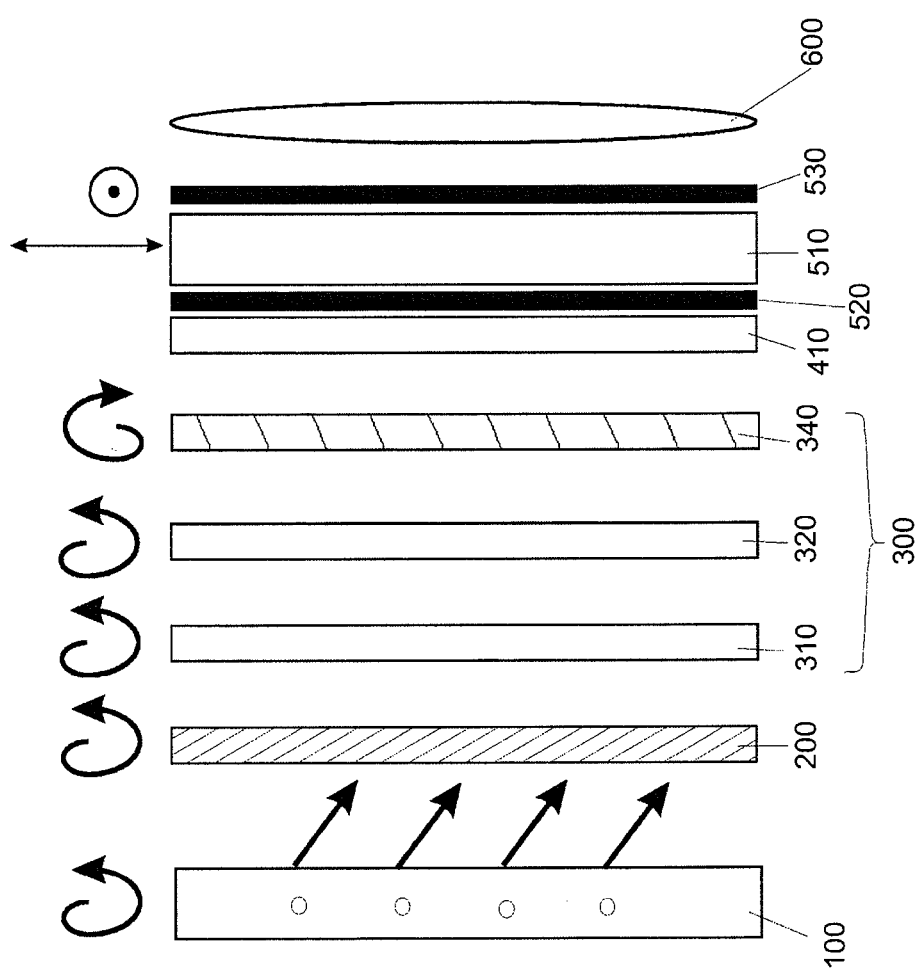

FIGS. 3a and 3b show a further exemplary embodiment similar to that in FIG. 2. In contrast to FIG. 2, it contains an illumination unit 100 having controllably different light emergence angles. In this case, FIG. 3a shows schematically, in a manner indicated by arrows, one controllably set light emergence angle and FIG. 3b shows another controllably set light emergence angle of the illumination unit 100.

In this example, the set light emergence angles both lie in the plane of the drawing. In general, an illumination unit 100 can also have additional settable light emergence angles for example perpendicular to the plane of the drawing.

Figure 4:
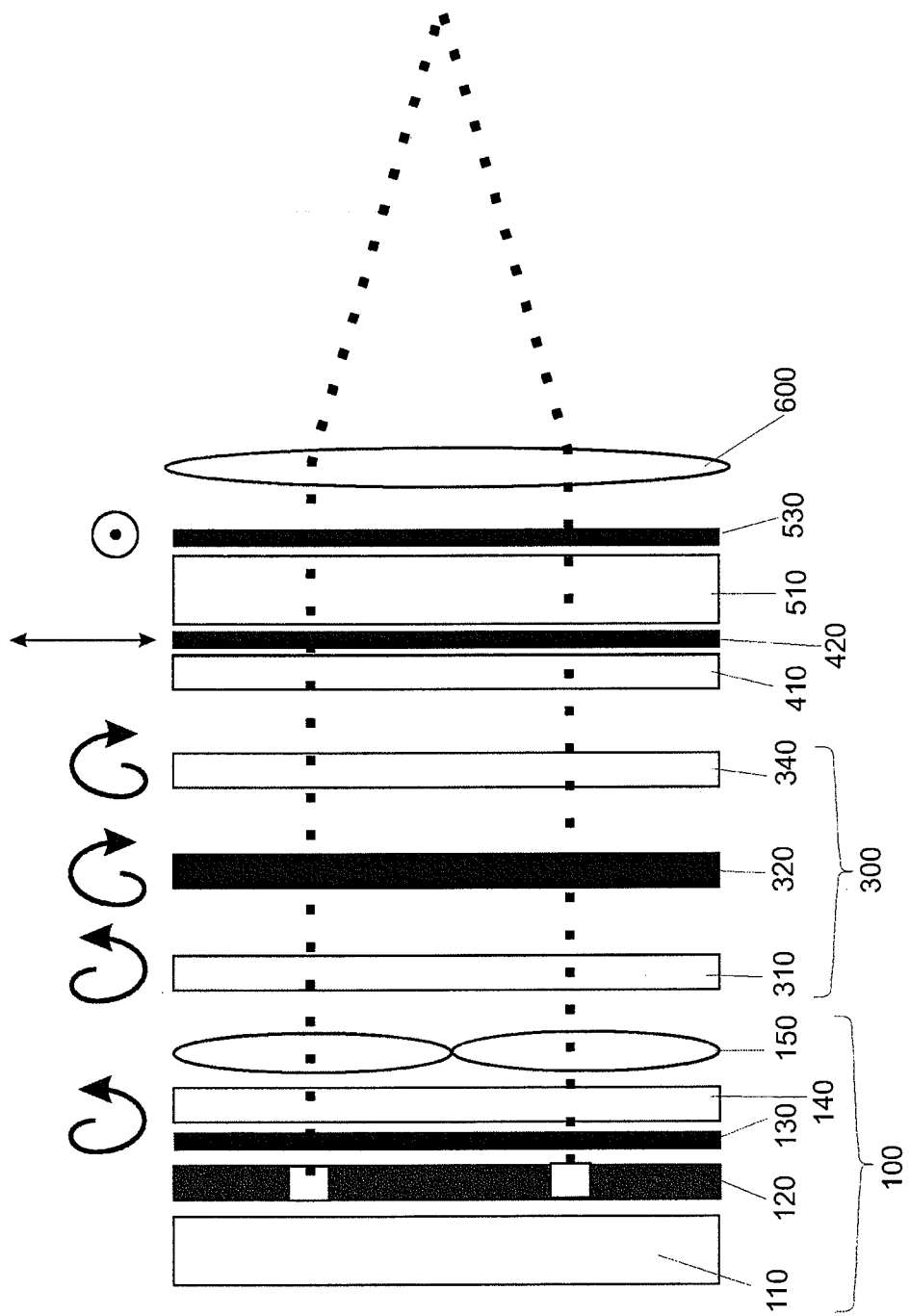
FIG. 4 shows a fourth configuration variant with an additional field lens 600.

FIG. 4 shows a further exemplary embodiment. In contrast to the first exemplary embodiment according to FIGS. 1b to 1e, an additional field lens 600 is provided here as in the second exemplary embodiment according to FIG. 2. In this case, FIG. 4 schematically depicts light beams which emerge from the slit diaphragm array 120 and are focused by the field lens 600. Both polarization gratings 310 and 340 are illustrated as not activated, as in FIG. 1*d*, with the result that the light passes through the polarization grating stack 300 without being deflected.

Figure 5:
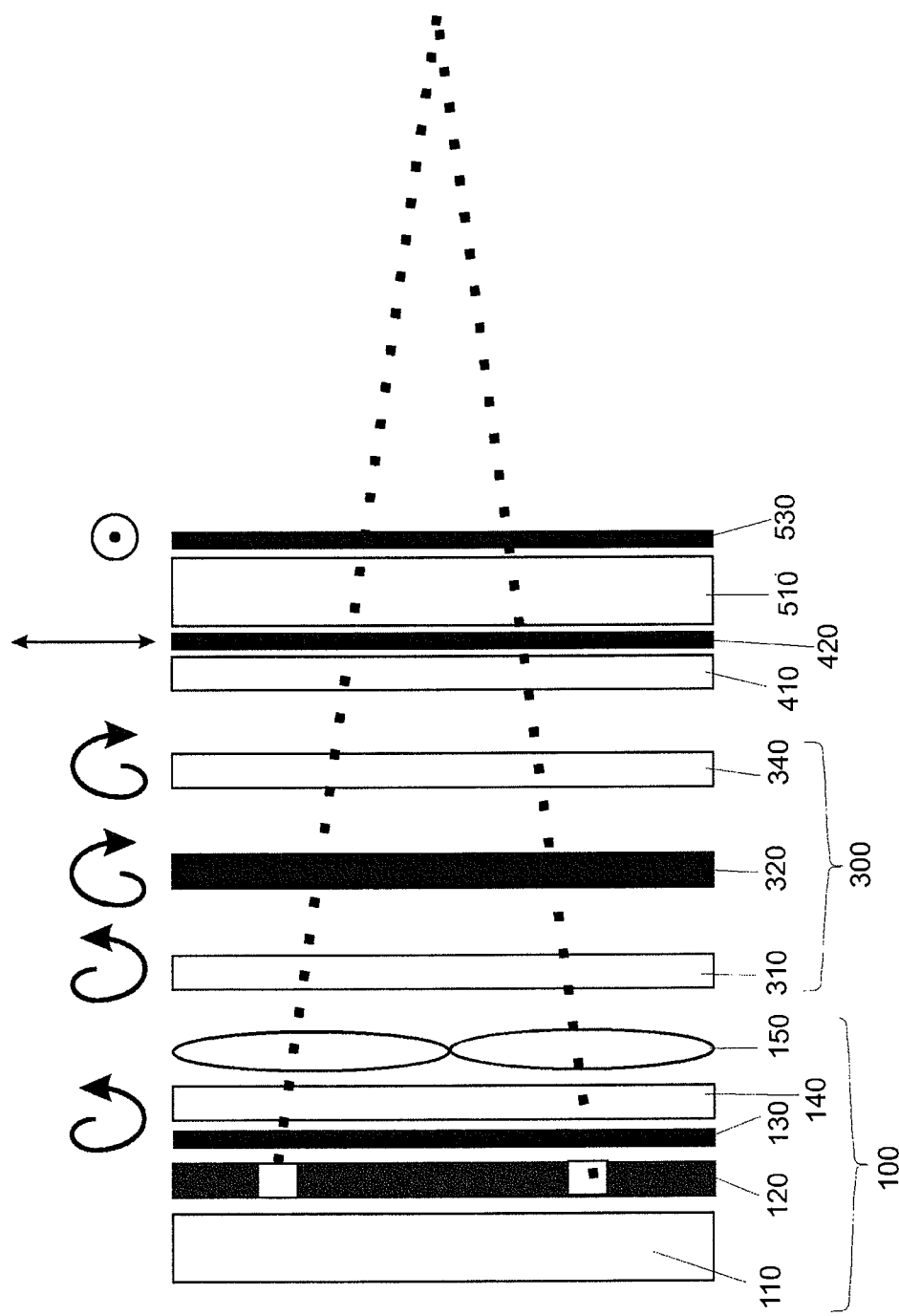
FIG. 5 shows a fifth configuration variant, in which the diaphragms in the slit diaphragm array 120 are set such that a field lens function is realized with the cylindrical lens array 150.

FIG. 5 shows an exemplary embodiment corresponding to the exemplary embodiment shown in FIGS. 1*b* to 1*e*. Here, however, the positions of the diaphragms in the slit diaphragm array 120 are set such that, in combination with the cylindrical lens array 150, the light emerging from different slit diaphragms is focused onto a common position. In this case, therefore, the cylindrical lens array also contains the field lens function, such that, in contrast to the exemplary embodiments according to FIGS. 2 to 4, an additional field lens can be dispensed with. Here as well, both polarization gratings 310 and 340 are illustrated as not activated, as in FIG. 1*d*, such that here as well the light passes through the polarization grating stack 300 without being deflected.

Figure 6:
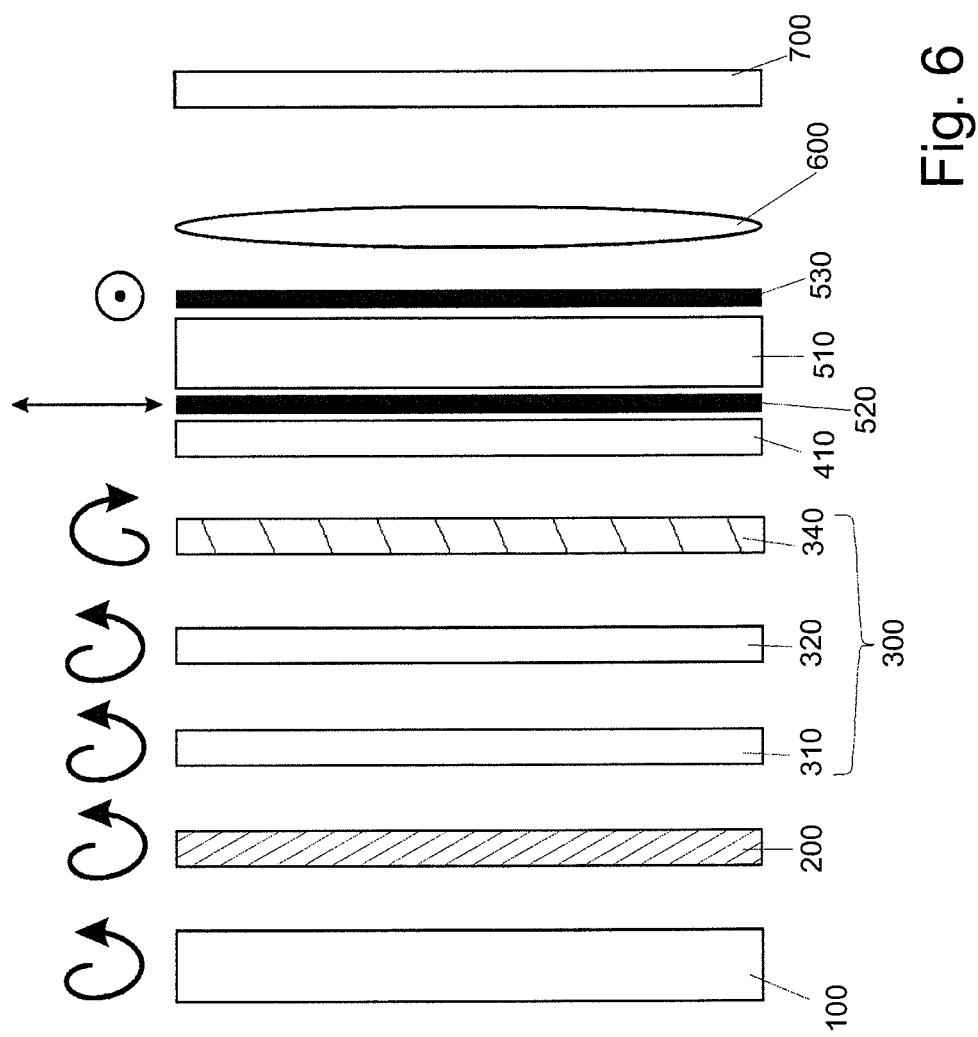
FIG. 6 shows a sixth configuration variant, which additionally contains a controllable deflection grating having a variable grating period 700.

FIG. 6 shows a configuration variant similar to FIG. 2. In addition thereto, it contains a controllable deflection grating having a variable grating period 700. In this example, the grating is arranged downstream of the polarization grating stack 300, the light modulator 510 and the field lens 600. The illustration shows that the second polarization grating 340 of the polarization grating stack 300 is activated analogously to FIG. 1*b*. Such a variable deflection grating 700 enables an additional finely stepped light deflection and/or compensation of the wavelength dependence of the light deflection in the polarization grating stack 300.

It is also possible to arrange the variable deflection grating upstream of the polarization grating stack 300 or between two individual components 310, 320, 340 of the polarization grating stack 300. The function of the deflection grating can also be divided among a plurality of components which can be situated at different locations in the beam path.

Figure 7:
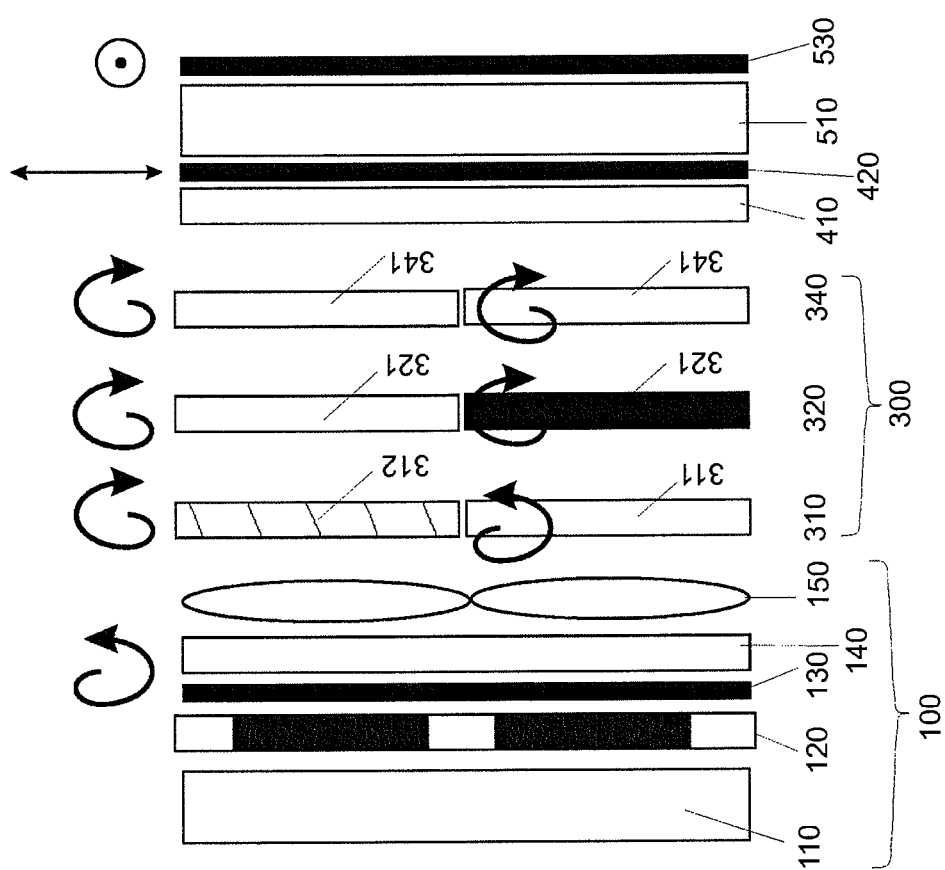
FIG. 7 shows a seventh configuration variant similar to FIG. 5, but with a spatial subdivision of the polarization gratings 310, 340 and the half-wave plate 320 in the polarization grating stack 300.

FIG. 7 shows a further configuration variant similar to FIG. 5. In this case, the polarization gratings 310 and 340 and the switchable half-wave plate 320 are subdivided into a plurality of separately switchable segments. In the example shown, purely by way of example, each optical component (310, 320, 340) was subdivided into two segments (311, 312, 321, 322, 341, 342). The polarization grating 310 is illustrated as activated in the upper segment (312); the switchable half-wave plate 320 is illustrated as activated in the lower segment. Downstream of the polarization grating stack 300, the emerging polarization state is the same in both segments, but the deflection angle differs in the upper and lower segments. This subdivision can be used for tracking a observer in the case of an extensive display. The segmentation can also be effected two-dimensionally or, for example, concentrically.

Figure 8:
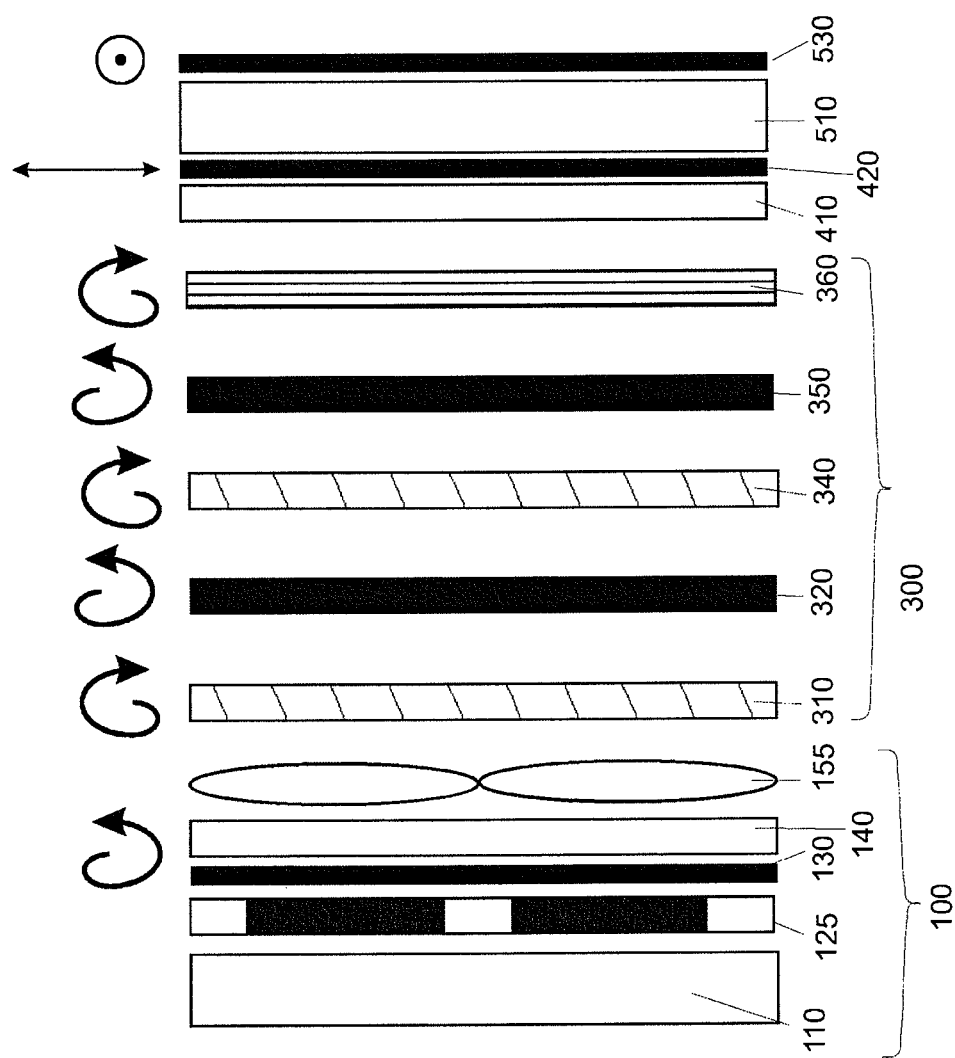
FIG. 8 shows an eighth configuration variant similar to FIG. 5, in which the polarization grating stack 300 contains an additional switchable half-wave plate 350 and an additional polarization grating 360 for a two-dimensional light deflection.

FIG. 8 shows a configuration variant similar to FIG. 5. In contrast to FIG. 5, the polarization grating stack contains an additional switchable half-wave plate 350 and an additional polarization grating 360. These elements are illustrated as activated in the figure. In the polarization grating 350, the grating structure is arranged in a manner rotated by 90 degrees in comparison with the polarization gratings 310 and 340. As a result, the deflection direction is also rotated by 90 degrees relative to the deflection direction of the gratings 310 and 340. Such a polarization grating stack can be used for example in combination with a two-dimensional arrangement of spherical lenses 155 and an array 125 of square or round diaphragms which are controllable in two directions. Observer tracking both in the horizontal direction and in the vertical direction thus becomes possible.

The grating structures of the two polarization gratings 310, 340 need not be arranged orthogonally with respect to the grating structure of the polarization grating 350, rather they can be arranged such that the deflection can be effected in two arbitrarily chosen directions.

Other illumination devices 100 that are controllable in two directions can also be employed.

Figure 9:
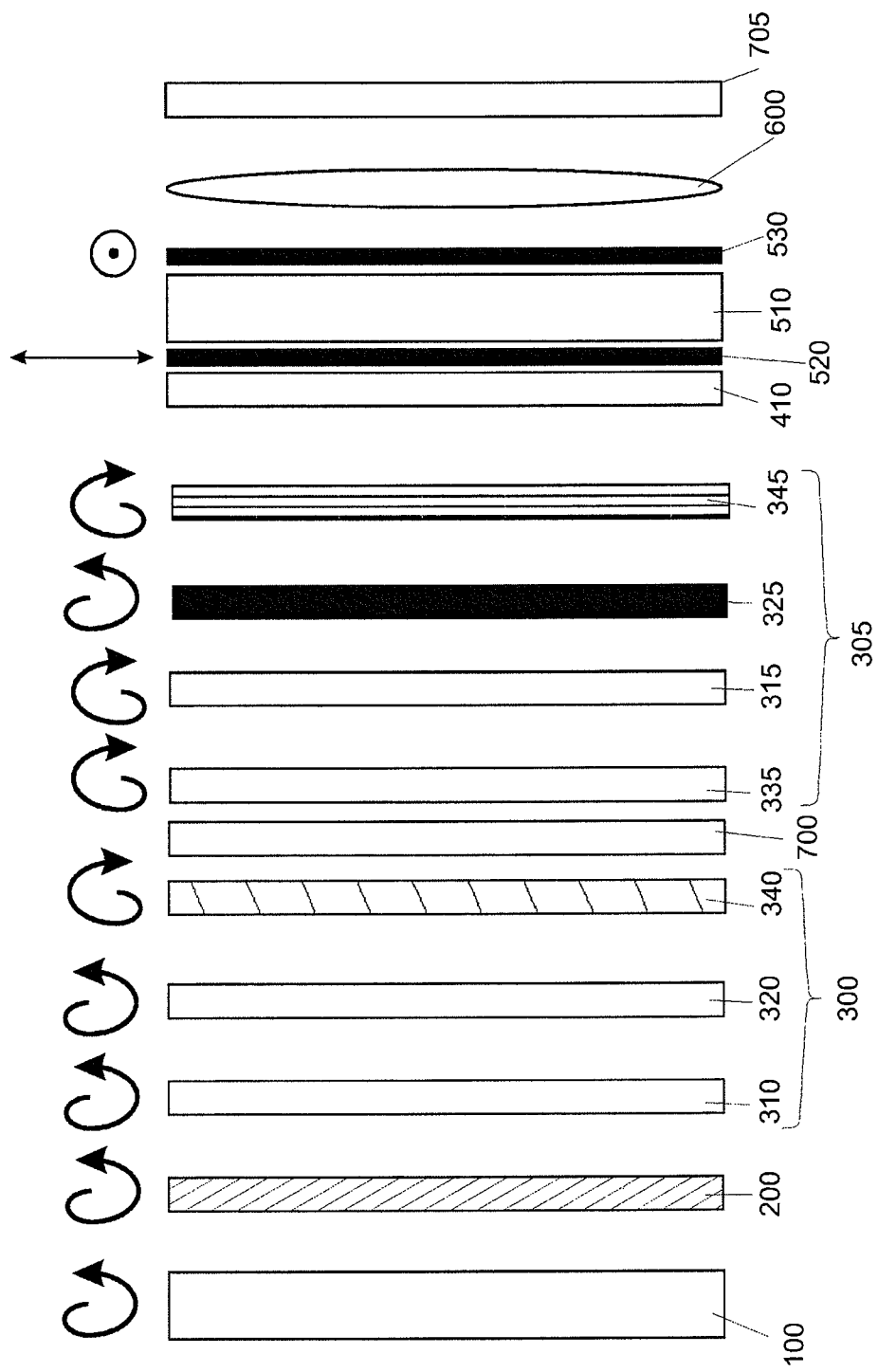
FIG. 9 shows a ninth configuration variant similar to FIG. 6, which contains an additional switchable or controllable polarization grating stack 305 and an additional controllable deflection grating having a variable grating period 705 for a two-dimensional light deflection.

FIG. 9 shows a configuration variant similar to FIG. 6. However, it additionally has a second switchable or controllable polarization grating stack 305, whose grating structure of the switchable or controllable polarization gratings 315, 345 illustrated is rotated relative to the grating structure of the two polarization gratings 310, 340 in the polarization grating stack 300. This configuration contains two controllable deflection gratings having a variable grating period 700 and 705. In this case, purely by way of example, the additional controllable deflection grating 705 having a variable grating period is assigned to the polarization grating stack 305, the diffraction direction of said deflection grating being coordinated with the diffraction direction of the polarization grating stack 305. The controllable deflection grating having a variable grating period 700 is assigned to the polarization grating 300 and is coordinated with the deflection direction thereof. Purely by way of example, it is arranged between the two polarization grating stacks 300, 305. In this case, the deflection grating 700 serves for example for horizontal light deflection, and the grating 705 for vertical light deflection. The variable deflection gratings 700 and 705 enable an additional finely stepped light deflection and/or compensation of the wavelength dependence of the light deflection in the polarization grating stacks 300 and 305.

The configuration variants in FIGS. 1 to 9 relate to the use of conventional polarization gratings. These polarization gratings have the property that they alter the polarization of the incident light, for example from left circular to right circular.

FIG. 10 shows a configuration variant of the invention in which the polarization grating stack 300 contains switchable or controllable polarization gratings 370, 380 which are based on a periodically twisted structure and in which the light passing through maintains the direction of rotation of its polarization. The configuration variant is constructed in a manner similar to FIG. 6. However, the first polarization grating 370 of the polarization grating stack 300 is illustrated as activated, that is to say that the light passes through this polarization grating in a diffracted and thus deflected manner. When the light passes through this polarization grating 370, the light maintains its direction of rotation of the polarization in the same way as when it passes through the second polarization grating 380, which is illustrated here as not activated, such that no further light deflection takes place therein.

If the intention is to use only one deflection direction, that is to say that only one fixed input polarization is selected for each grating 370, 380, it is possible to dispense with a switchable or controllable retardation layer between two successive switchable or controllable polarization gratings 370, 380, as is illustrated purely by way of example here in FIG. 10. Since the polarization gratings 370, 380 used here do not change the direction of rotation of the polarization as light passes through, advantageously in this configuration variant no polarization rotating layers are required between the polarization gratings 370, 380 if polarization gratings having an identical twist are used in the layer stack. In this example, the illumination unit 100 generates right circularly polarized light. This right circular polarization state is maintained during passage through both polarization gratings 370, 380. For a spatial light modulator 510 that requires linearly polarized light, as in FIG. 6 a birefringent retardation layer 410 can be included and undesired stray light of the zeroth order of diffraction can be suppressed by means of a linear polarizer 520.

Finally, it should be pointed out very particularly that the exemplary embodiments discussed above serve merely to describe the claimed teaching, but do not restrict the latter to the exemplary embodiments. In particular, the exemplary embodiments described above could—insofar as is possible—be combined with one another.

LIST OF REFERENCE SIGNS

100 Illumination unit
110 Light source matrix
120 Controllable slit diaphragm array
125 Controllable diaphragm array
130 Polarization filter
140 Birefringent retardation layer
150 Cylindrical lens array
155 Lens array
200 Variable controllable polarization grating
300 Polarization grating stack
305 Rotated polarization grating stack
310 $1^{st}$ switchable polarization grating
311 $1^{st}$ segment of the $1^{st}$ switchable polarization grating
312 $2^{nd}$ segment of the $1^{st}$ switchable polarization grating
315 $1^{st}$ switchable polarization grating in the rotated polarization grating stack
320 switchable birefringent retardation layer
321 $1^{st}$ segment of the switchable birefringent retardation layer
322 $2^{nd}$ segment of the switchable birefringent retardation layer
325 Switchable birefringent retardation layer in the rotated polarization grating stack
335 Switchable birefringent retardation layer in the rotated polarization grating stack
340 $2^{nd}$ switchable polarization grating
341 $1^{st}$ segment of the $2^{nd}$ switchable polarization grating
342 $2^{nd}$ segment of the $2^{nd}$ switchable polarization grating
345 $2^{nd}$ switchable polarization grating in the rotated polarization grating stack
350 Switchable birefringent retardation layer
360 Rotated switchable polarization grating
370 $1^{st}$ switchable polarization grating maintaining the direction of polarization
380 $2^{nd}$ switchable polarization grating maintaining the direction of polarization
410 Birefringent retardation layer
420 Linear polarization filter
510 Spatial light modulator
520 Linear polarization filter
530 Linear polarization filter
600 Field lens
700 Controllable deflection grating
705 Rotated controllable deflection grating

The invention claimed is:
1. A display, in particular an autostereoscopic or holographic display, wherein image views or reconstructions of holographically encoded objects can be tracked to movements of associated eyes of at least one observer with an eye-position recognition system, comprising:
an illumination unit for generating light that is collimated to the greatest possible extent with a predefinable emission characteristic, the light of the illumination unit having a predefinable circular polarization
at least one polarization grating stack having a stack of optical components comprising at least two switchable or controllable polarization gratings, each comprising a grating structure that can be switched on for light deflection,
a spatial light modulator for modulating the light of the illumination unit for displaying image information or for reconstructing encoded hologram information, and
a system controller for driving and synchronizing the switchable or controllable polarization gratings, the illumination unit and the spatial light modulator,
wherein, depending on the current position of the eyes of an observer, the illumination unit and the polarization grating stack are drivable by the system controller in such a way that the light of the illumination unit is deflectable in the direction of the eyes of the observer.

2. The display as claimed in claim 1, wherein the polarization grating stack additionally comprises as optical component at least one switchable or controllable birefringent retardation layer.

3. The display as claimed in claim 1, wherein an additional birefringent retardation layer is situated downstream of the polarization grating stack in order to convert circularly polarized light into linearly polarized light.

4. The display as claimed in claim 3, wherein a polarization filter is situated downstream of the additional birefringent retardation layer, said polarization filter suppressing linearly polarized light of the zeroth order of diffraction of a switched-on polarization grating.

5. The display as claimed in claim 1, wherein a controllable deflection grating having a variable grating period is arranged upstream or downstream of or in the polarization grating stack.

6. The display as claimed in claim 1, wherein the illumination unit comprises controllably different light emergence angles.

7. The display as claimed in claim 1, wherein at least one optical component in the polarization grating stack is embodied as segmented in one or two directions, wherein the individual segments are separately switchable or controllable.

8. The display as claimed in claim 1, wherein the grating structure of at least one polarization grating in the polarization grating stack is arranged in a manner rotated with respect to one another, or in that the display comprises a second polarization grating stack, wherein the grating structure, with respect to the grating structure of the first polarization grating stack is rotated by an angle with respect to one another.

9. The display as claimed in claim 1, wherein the polarization grating stack comprises at least one switchable or controllable polarization grating in which the direction of rotation of the light upon passing through the polarization grating is maintained.

10. The display as claimed in claim 1, wherein the polarization grating stack is arranged in the light path between the illumination unit and the spatial light modulator.

11. The display as claimed in claim 1, wherein the light sources of the illumination unit are arranged in an array of primary light sources as a light source matrix, which are switchable or controllable individually or in columns.

12. The display as claimed in claim 1, wherein the light sources are LEDs or OLEDs.

13. The display as claimed in claim 1, wherein the light sources consist of a plurality of separately operable individual light sources having different focus wavelengths of their emission characteristic.

14. The display as claimed in claim 1, wherein the illumination unit comprises a switchable or controllable array of slit diaphragms.

15. The display as claimed in claim 14, wherein the array of slit diaphragms is embodied as an LCD diaphragm array.

16. The display as claimed in claim 1, wherein the illumination unit comprises a cylindrical lens array for the purpose of collimation.

17. The display as claimed in claim 16, wherein the cylindrical lens array additionally comprises a field lens function.

18. The display as claimed in claim 1, wherein light of the illumination unit has a predefinable circular polarization.

19. The display as claimed in claim 1, wherein an additionally fixed or variable field lens is contained in the beam path between the illumination unit and the observer.

* * * * *